United States Patent

Wong

[11] 4,057,925
[45] Nov. 15, 1977

[54] FISHING LURE RETRIEVER

[76] Inventor: Yen Bak Wong, 3180 38th Ave., Sacramento, Calif. 95820

[21] Appl. No.: 686,288

[22] Filed: May 14, 1976

[51] Int. Cl.² .............................................. A01K 97/00
[52] U.S. Cl. .................................................... 43/17.2
[58] Field of Search ......................................... 43/17.2

[56] References Cited

U.S. PATENT DOCUMENTS

| 2,807,906 | 10/1957 | Chan Mun | 43/17.2 |
| 3,568,353 | 3/1971 | Kilgore | 43/17.2 |

*Primary Examiner*—Russell R. Kinsey
*Assistant Examiner*—Peter K. Skiff
*Attorney, Agent, or Firm*—J. L. Bohan

[57] ABSTRACT

A fishing lure retrieving unit of substantial and rugged construction for the retrieval of artificial fishing lures that become snagged or fouled on underwater objects, such as logs, rocks or underwater vegetation. The retrieving unit is provided with several forward grappling hooks of comparatively heavy gauge metal for the purpose of bringing the submarine obstruction to the surface with the lure intact, thereby minimizing any damage to the lure itself. In those cases where the obstruction, due to its physical mass or physical features cannot be brought to the surface by the grappling hooks, the device is provided with secondary hooking means for the purpose of engaging the barrel or snap swivel attached near the nose of the fishing lure, thereby permitting its retrieval by forceably pulling the hook through or around the underwater object. In those lures which contain several free swinging, multiple barbed, mounted fishhooks, the retrieving unit in badly snagged or snarled underwater conditions is able to snag the free hook, thereby gaining a solid parcel on a lure allowing it to be pulled free of the underwater object.

10 Claims, 6 Drawing Figures

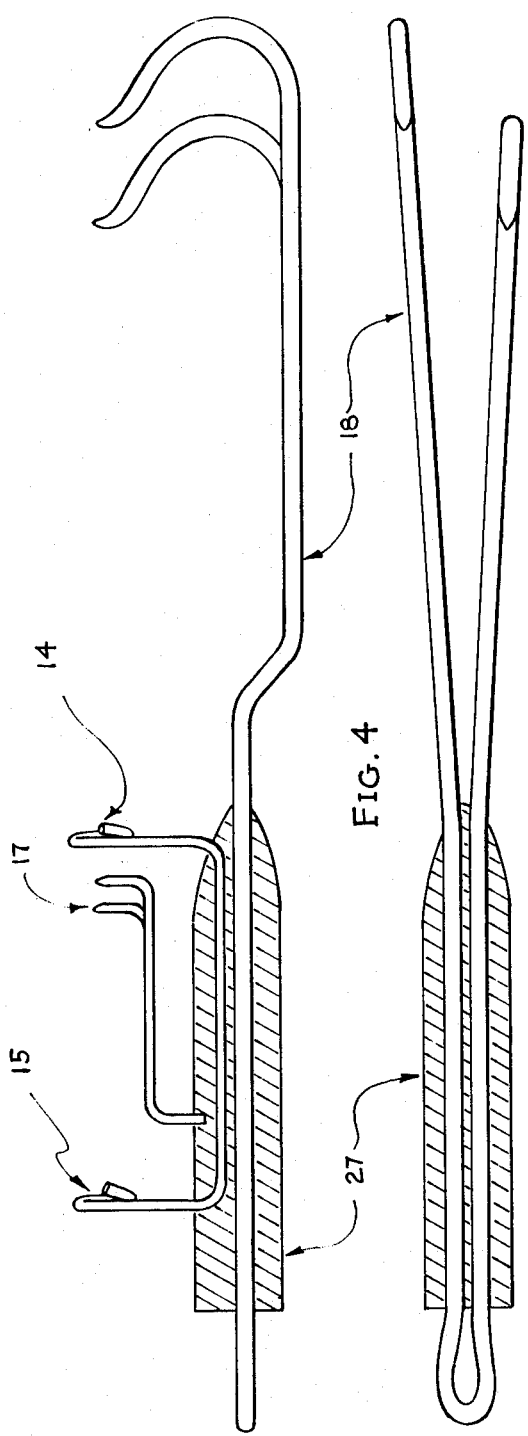
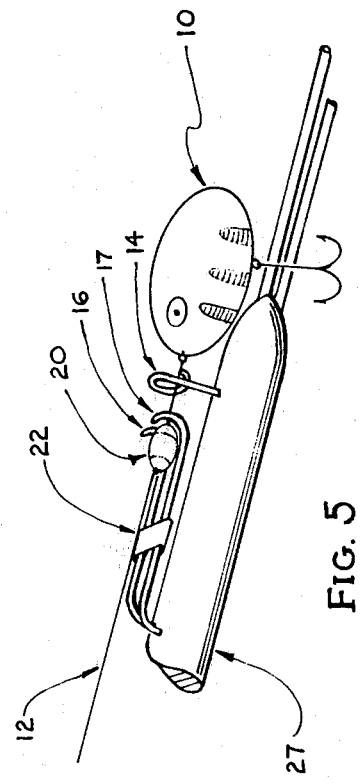
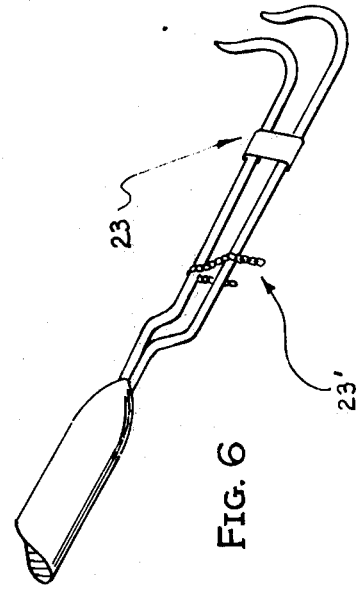
FIG. 4
FIG. 5
FIG. 6

FISHING LURE RETRIEVER

BACKGROUND OF THE INVENTION

1. Field of the Invention

The present invention relates to fishing-tackle gear and, more particularly, to a manually operated device for the retrieval of a fishing lure which has become snagged or fouled on an underwater object.

2. Description of the Prior Art

It is well recognized that anglers and sport fishermen incur a heavy loss of relatively expensive fishing lures and plugs by virtue of their becoming ensnared on a wide variety of objects under the water which cannot be detected by the angler, since they are not visible to his observation. That this is a substantial problem to the fishing sport enthusiast is apparent from the large variety of fishing lure retrievers that may be found in the prior art. Those devices of the prior art fall into mostly four categories. One category of retriever relies upon a heavy weight following the fishing line down to the lure which relies upon repeated impact of the heavy retriever on the lure for the purpose of dislodging the snagged hook from the underwater object. Another class of device relies upon grappling hooks which will hopefully seize the underwater object for the purpose of pulling it to the surface, or breaking it, so that the lure is thereby freed. The third type of device relies upon suitable means such as chains which will become ensnared in one of the free hooks mounted on the lure, thereby permitting a solid parcel to be obtained thereon so that it may be pulled free of the underwater object. The fourth device relies upon the retrieving unit following the line down to some portion of the tackle forward of the lure on which a grip may be obtained for the purpose of pulling the lure free. A typical device is one which is lowered to the point where it attaches onto one of the barrel or snap swivels in proximity to the lure, thereby allowing it to be pulled free.

Exemplary of the prior art devices which rely on the weight of the retrieving unit impacting the lure and thereby loosening the hooks, is U.S. Pat. No. 2,443,061, issued to R. E. Waltamath. This device, like all of the impact type devices, can only function if the lure itself is out in the open and only the hook is somewhat obscured by the underwater object. If the hook is on the underside of a log and the lure is wrapped around the log, there is no possible way that the impact type lure retriever can reach the lure in order to impact it. Moreover, even in those cases where the impact is possible, the fishhook that is snagged is not rigidly affixed to the lure but is usually swivelled and free swinging so that little of the force of impact is transmitted to the hook itself, but simply swings the lure off into a direction to one side or the other. Another device of the impact variety is described in U.S. Pat. No. 3,643,366, issued to Eugene R. Gates. It likewise is only able to function by means of loosening the hook by impact if the lure is in the open allowing a clean shot at the lure with the impact device.

Both of the foregoing patents referenced above also are exemplary of the devices which have grappling means for engaging the submerged obstruction, such as a branch, rock, or other obstruction. However, these devices are constructed in such a manner as to put the grappling hooks only in the general proximity of the area of obstruction and rely upon a relatively open environment to allow the hook or bill portion of the grappling hooks to obtain a bite on the submarine obstruction at some point below where the lure is hooked thereto. Only by getting below or beyond the hook is it possible for the grappling hooks to tear loose the obstruction or allow its being brought to the surface. Referring to that in the Waltamath device, it will be difficult for the grappling hook to proceed much beyond the snagged hook in the fishing lure, since the slideway or keeper will become hung up on the lure or the lure hook. In the Gates device, the eyelet which guides the retrieving unit down the main fishing line is somewhat farther removed from the grappling hooks, but this produces the unsatisfactory result of allowing the grappling hooks to swing out from the alignment with the line whereby it will grapple with objects that are not in the proximity of the fishing lure.

An example of a prior art device which relies upon engagement with the swivel just forward of the ensnared lure, is U.S. Pat. No. 2,889,655, issued to H. K. Switzer. This device has an opening which permits the unit to follow the main fishing line down to the swivel where it will engage the swivel to allow a firm grip on the lure assembly. Again, this device is functional only if there is an open and clear shot at the lure and the line proceding the point of engagement is not further ensnared or in contact with underwater obstructions.

Further example of a retrieving unit that relies upon gripping the swivel snap, is U.S. Pat. No. 2,915,845, issued to F. C. Hughes. This device operates in a very similar fashion as the Switzer device and likewise relies upon there being a comparatively open and free access to the swivel.

There are numerous devices which rely upon a retrieving unit containing depending, free-hook-ensnaring means. A typical device is that shown in U.S. Pat. No. 3,163,955, issued to I. L. Lockwood, which shows a depending curtain of small chains which are placed in the proximity of the snagged lure, so that, hopefully, one of the chains will become ensnared in one of the free hooks of the lure, thereby permitting its being pulled free of the obstruction.

The above are simply exemplary of the prior art showing the various kinds of retrieving units for freeing fishing lures from underwater obstructions. Invariably, the specific means employed by the prior art devices assume one particular condition of ensnarement. Most of the devices rely upon the snared lure being in relatively open water at the point directly above the point of ensnarement. It is an object, therefore, of the present invention to provide for alternative lines of attack for purposes of freeing the ensnared lure, since the angler generally has no information as to just what the circumstances are in the vicinity of the ensnared lure. The angler is not able to see into the water in order to develop the most sound engineering approach to obtaining a parcel on the lure or the submarine obstruction so as to permit its retrieval. This is a fundamental and significant feature of the present invention, which recognizes that the angler as a problem solver is unable to determine the nature of his problem and is usually completely without information as to just how his lure is snagged on the underwater obstruction. Faced with this unknown, he needs at his disposal a device which will permit a variety of approaches for freeing the lure and the process of trying the various alternatives invariably helps him develop a fairly accurate picture of the manner in which the lure is ensnared, thereby permitting him to not waste time on ineffective approaches but concentrate on the approach which is most likely to succeed.

SUMMARY OF THE INVENTION

A preferred embodiment made in accordance with the principles of the present invention utilizes a solid member of substantial weight which is cylindrical in form, which contains at the leading point thereof two large grappling hooks which extend for a considerable distance beyond the solid member, two eyelets for tracking the fishing line down to the lure, a pair of smaller hooks in alignment on either side of the fishing line and located between the aforesaid eyelets, and a loop at the aft portion thereof for the purpose of affixing a heavy cord or line. The two large forward hooks, hereinafter referred to as the grappling hooks, are made of heavy guage wire capable of plastic deformation without breaking. They are configured in such a manner as to straddle the lure and continue beyond the lure whence the unit reaches the vicinity in which the lure is snagged. The preferred embodiment of the present invention provides for grappling hooks which are not of equal length, in order to maximize the probability of engagement with the submerged object. Since they are capable of being plastically deformed, they may be bent by hand or with pliers into any configuration as circumstances require in order to properly engage with the underwater object. The retriever can be lowered and raised a number of times for the purpose of empirically arriving at the best angle and attitude of the grappling hooks so as to obtain a parcel on the submerged object, such as, underwater vegetation, branches, bark on submerged stumps, rocks, etc. The grappling hooks are the first line of attack in attempting to free the lure, since their objective is to free the lure without applying any force on the lure itself—only the obstruction. This permits the lure to be retrieved without damage. If the angler, after repeated attempts is unable to dislodge the obstruction itself, then the angler may resort to the second mode of attack whereby the unit is lowered to the point where the nose of the lure comes quite close to the first eyelet, which is big enough to allow the swivel fitting to pass through the eyelet and over the two smaller hooks, which are aligned on either side of the fishing line. Once the swivel snap passes over the hooks, the retrieving unit may then be pulled back by its cord so that the two smaller hooks engage the swivel, thereby permitting the lure to be pulled free by force on the swivel snap. Should either of these approaches fail, the retrieving unit can then be pulled back several inches up the fishing line so as to put the two grapple hooks in proximity to any free hooks that may be located on the ensnared lure. Most lures contain at least two three-prong hooks and, should one of the grappling hooks engage a free hook on the lure, the lure can thereby be pulled free.

The unit is of rugged construction since the two main grappling hooks are one continuous piece of wire passing through the entire cylindrical body, out the back portion to form the loop which engages the cord or cable of substantial strength, which is used for lowering and raising the retrieving unit. The eyelets are likewise of substantial construction and are of one piece of wire, which are in contact with one of the grappling hooks within the enclosed solid cylinder. The two minor hooks, which are used for engaging the swivel snap, are of one-piece construction, and loop underneath the eyelet and grapple hook wires so as to obtain a firm parcel within the body of the retrieving unit.

BRIEF DESCRIPTION OF THE DRAWINGS

FIG. 4 is a cross-sectional view taken along line 4—4 of FIG. 1 showing the internal construction of the unit.

FIG. 5 is a perspective view of the device employing a keeper on the minor hooks.

FIG. 6 is a perspective view of the device employing a keeper and snagging means on the grappling hooks.

DETAILED DESCRIPTION

Figure 1:
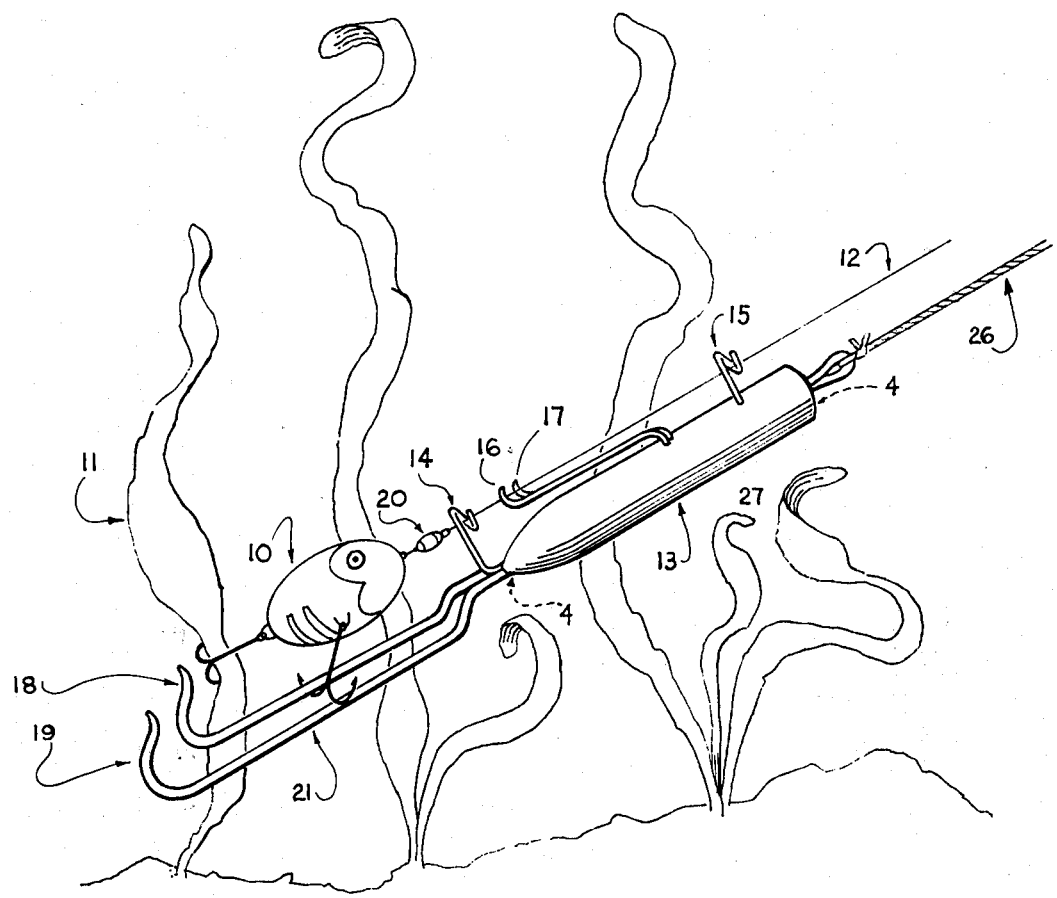
FIG. 1 is a perspective view of an embodiment of the present invention and showing a fishing lure entangled in underwater vegetation.

Referring by numerals to the accompanying drawings, which illustrate a preferred embodiment of the device, in FIG. 1 the fishing lure in 10 is shown ensnared deeply within underwater vegetation 11. If the angler attempts to continue to pull on fishing line 12, he will only succeed in eventually breaking the fishing line and losing a good portion of his line as well as the lure and its attendant hardware, such as the swivels, snaps, leaders, etc. The fishing lure retrieving device of the present invention is shown as 13 on FIG. 1 and is brought into the vicinity of the fishing lure 10 by virtue of attaching split-attaching eyes 14 and 15 under the fishing line 10 and lowering the unit 13 along the fishing line 10 by means of the strong cable or rope 26. The main body 27 is comprised of a heavy material, such as lead, so as to permit the rapid descent of the unit to the vicinity of the fishing lure. The center of gravity of the retriever 13 is between eyelets 14 and 15. If the lure is caught in underwater vegetation, the leading portions of the retrieving unit, namely, the grappling hooks 18 and 19, will continue down to the lure, and straddle the lure, and continue somewhat beyond it. It is usually preferable at this point to bend the minor hooks 16 and 17 out of the way so that they do not grasp the swivel, and allow the grappling hooks 18 and 19 to engage the underwater obstruction, such as the vegetation in this case. The retrieving unit is then pulled backwards by line 26 so as to rake along the vegetation, often pulling the vegetation up by the roots or breaking it off, so as to free the lure without any damage to the lure. The hooks 18 and 19 can be bent outwardly or downwardly so that different conditions that may exist can be accommodated in order to permit the lure to be freed. It is preferable to make the main grappling hooks 18 and 19 of substantial guage wire so that considerable force may be applied by line 26 before the bite of the hook begins to plastically deform, thereby straightening the hooks. Preferably the wires will be of sufficient strength that, in order to bend the hook ends, it will be necessary to use a pair of pliers. However, in those cases where only light vegetation or small underwater obstructions are encountered, it is, of course, appropriate to use a lighter guage wire which may be bent by the fingers. If, for some reason, the grappling hooks are unable to obtain a parcel on the underwater vegetation, the angler may then move minor hooks 16 and 17 into position by bending them back so that they are able to straddle the fishing line on each side. The retrieving unit is then lowered back down the fishing line 12 and the swivel 20 passes through the first eyelet 14 which is designed to be of sufficiently large diameter to allow the swivel to pass therethrough, whereupon the swivel then touches upon the minor hooks 16 and 17, which are bent backwards, thereby not obstructing the movement of the swivel 20 at that point, and causing the swivel then to proceed back behind hooks 16 and 17. Pulling on line 26 will now cause the swivel 20 to come in contact with the back side of hooks 16 and 17 and be held firmly therebetween. The application of continued pressure on line 26 will then cause the hooks 16 and 17 to act through the swivel so as to pull the lure and thereby free it from the underwater vegetation. If this does not succeed, then it is possible to turn the grappling hooks 18 and 19 slightly inwardly and compress them somewhat closer together so as to increase the probability of engaging one of the free three-pronged hooks on the fishing lure. If this is accomplished, this will permit the lure to be pulled free of the obstruction.

Figure 2:
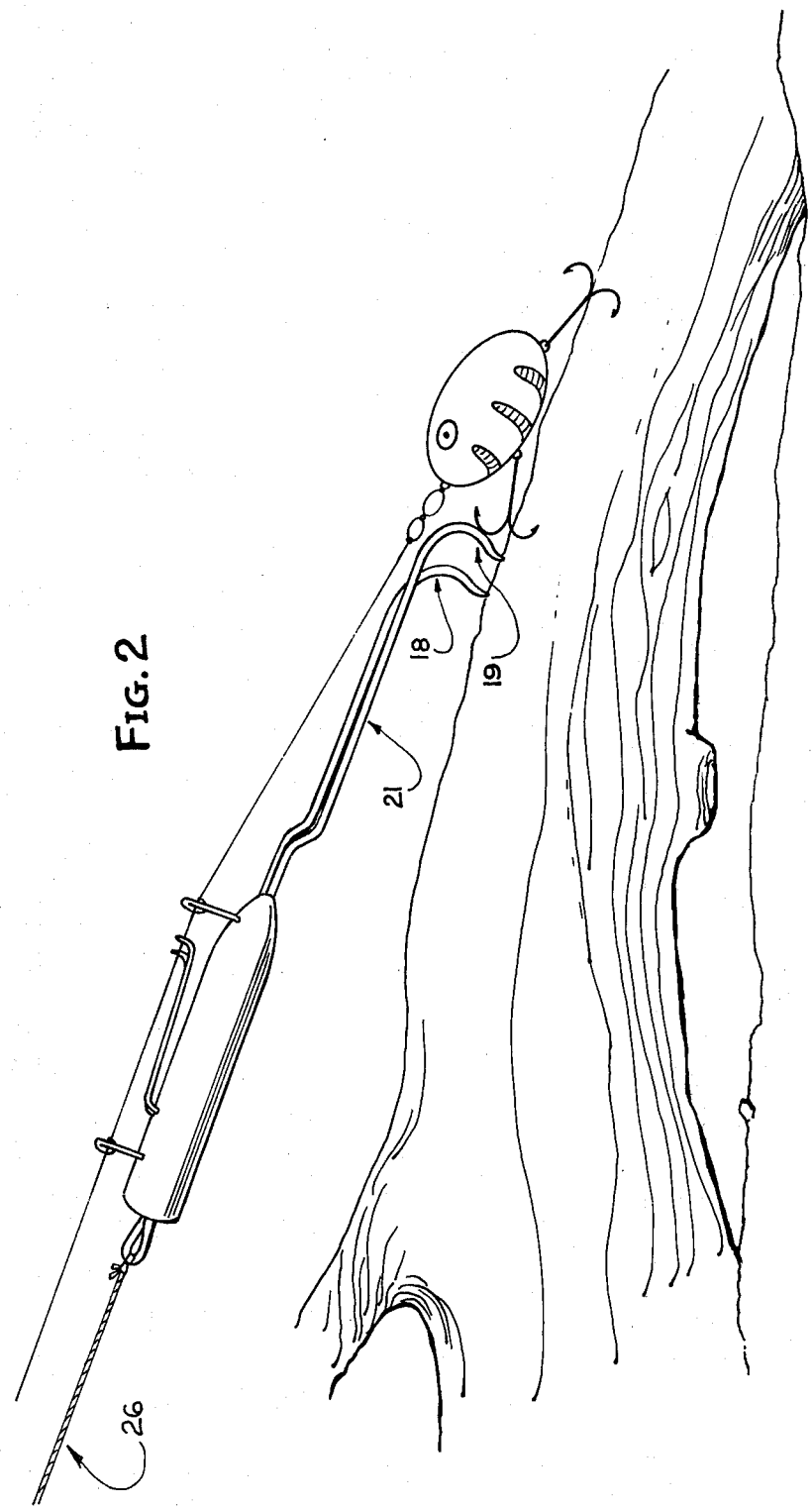
FIG. 2 shows a present embodiment used for the purpose of freeing an ensnared lure hooked on a submerged log.

A more complex situation, as shown in FIG. 2 is encountered when the fishing lure is snagged on the far side of an underwater obstruction, such as a submerged log, thereby putting the lure and/or its swivel out of reach from the retrieving unit. The angler, not knowing what the obstruction is in this case, will lower the retriever in the normal manner, but will soon find that he is obtaining absolutely no resistance from the underwater obstruction. This is because the underside portion 21 of the grappling hooks is such that it offers no resistance. The angler, after some use of the device, will soon recognize by feel what the nature of the snag is because of the lack of resistance or the kind of resistance that he senses through line 26. In this case he will soon recognize that he must turn the tines 18 and 19 in a downward direction so as to obtain a parcel on the submerged log or other round object. Upon doing so, and then lowering the unit into the water along the fishing line, he will then note that there is some resistance and usually he will be able to tear loose the bark in the vicinity of the lure in such a fashion as to cause the lure to become free, or he will be able to succeed in moving or rolling the log so that the lure or its swivel comes into a position were it is possible to obtain the parcel on the lure through the minor hooks 16 and 17 or by means of snagging one of the free hooks on the fishing lure 10 by means of the grappling hooks 18 and 19 which are now bent in a more inwardly direction instead of downwardly.

Figure 3:
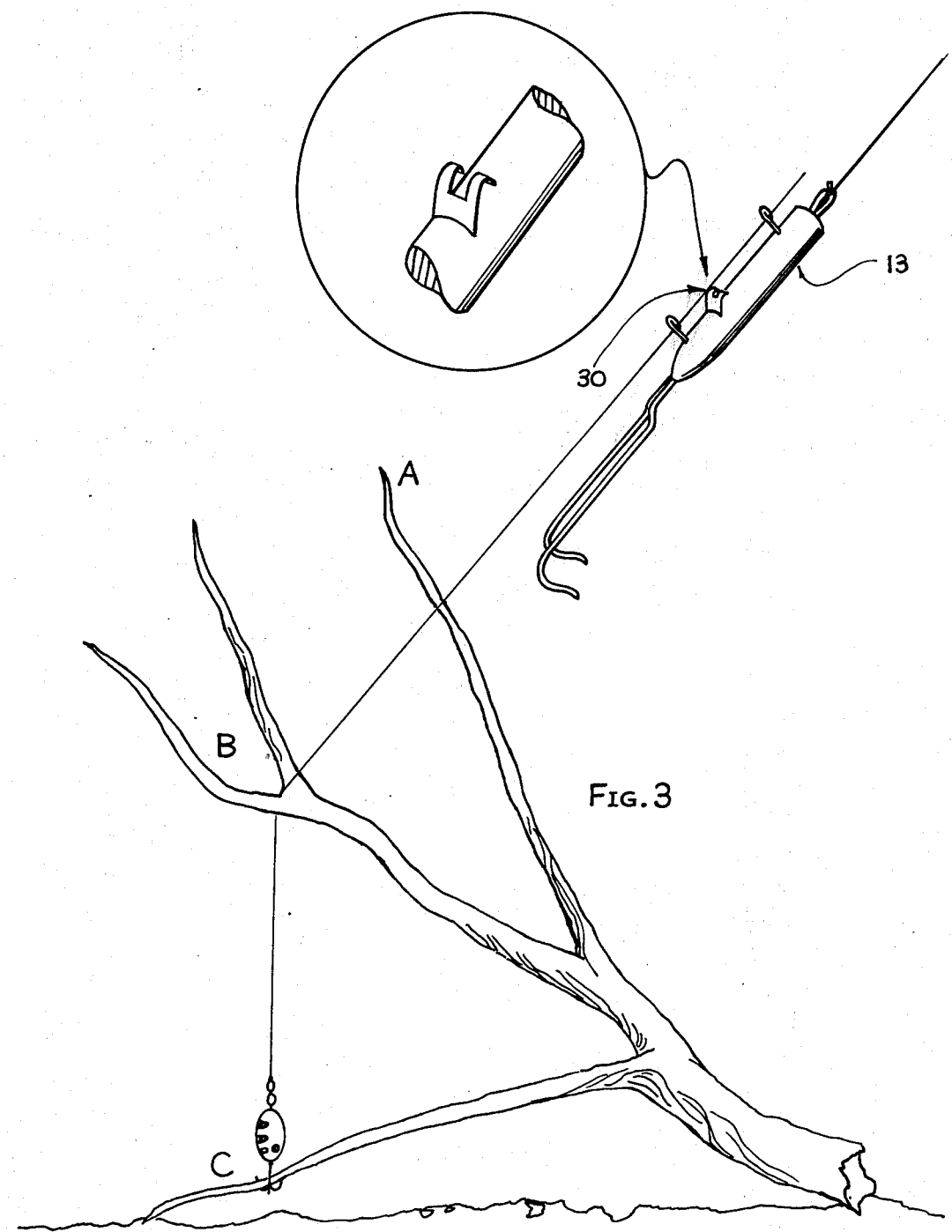
FIG. 3 shows an embodiment of the present invention snared in a series of branches in a submerged tree or shrub.

As shown in FIG. 3, a considerably complex problem is encountered by the unsuspecting angler. By lowering the retrieving unit of the present invention down to the snagged lure, he will again meet no resistance, since the smooth-bottom portion 21 will encounter no resistance from branch No. A on the submerged bush or tree. Again, the angler will soon realize that he must turn the tines 18 and 19 downwardly so as to engage branch A whereupon branch A can be broken off. He will then attempt to reach branch B which may require that one of the tines be pointed downwardly and one of them slightly upwardly, so as to get a proper parcel onto branch B and thereby breaking it free from the fishing line. Having pulled the branches A and B clear and out of the way, the line is fairly accessible to the retrieving unit, allowing the tines 18 and 19 to be bent in a downwardly direction so as to engage the last branch C, breaking it and thereby freeing the fishing lure.

FIG. 4 is a cut-a-way view of the retrieving unit of the present invention showing its extremely rugged construction. The main grappling hooks 18 and 19 are formed of one continuous piece of wire or cylindrical metal forming a loop at the rear portion of the retrieving unit for engaging the heavy guage cord or cable. The eyelets 14 and 15 may be formed of a somewhat lighter guage wire but are, again, a continuous piece of wire which is laid in proximity to one of the grappling hook wires. The minor hooks 16 and 17 are formed of one continuous piece of wire and are hooked underneath either one or both of the aforementioned wires. These three separate pieces of wire are then preferably soldered or welded so as to make one integral piece of substantial strength. Once that is done, the cylindrical body of the present invention is formed by pouring a material such as lead into a casting fixture which is affixed around the assembled wires.

It is usually preferable that the tines 16 and 17 of the minor hooks be somewhat staggered so as to minimize the resistance of the swivel as it passes over these hooks. However, even if they are not staggered but completely parallel and of the same length, it is usually possible for the swivel to pass over the tines 16 and 17 and engage the back side of these tines. AS shown in FIG. 5, a further improvement is to form a small keeper 22 which can be spread forwards and backwards along the shank portion of the minor hooks 16 and 17. By sliding 22 all the way back to the body 17, the shank portions can usually then be bent outwards in those cases where it is preferable not to engage a swivel at the outset. However, once it is determined that the swivel approach must be used, then the keeper 22 can be moved forward so that the tines 16 and 17 are held firmly in position so as to avoid spreading once the swivel is grasped therebetween. Another variation, as shown in FIG. 6, is to have available a keeper 23 which can be slid over the tines 18 and 19 of the grappling hooks and moved into a position which is likely to engage one of the free hooks on the lure. This is one of the devices that can be used in the event all of the approaches have not succeeded. It is obvious, of course, that this keeper 23 can be just simply a wire slipped over the shank portions of grappling hooks 18 and 19 or may be embellished with other devices to further assure engagement with one of the free hooks on the lure, such as constructing it of a chain material 23, or a series of chains.

Both eyelets 15 and 14 are constructed of an open loop or "pigtail" so as to allow ready attachment to the fishing line. However, it will be seen from the above that there is a significant juxtapositional relationship between eyelet 14 and tines 18 and 19 forward of the eyelet 14 and tines 16 and 17 to the rear of eyelet 14. The eyelet opening is large enough to allow the swivel 20 but not the lure to pass therethrough. Accordingly, when the retriever has been lowered as far as it can possibly go, the eyelet 14 touches the nose of the lure and the length of the shank portion of the grappling hooks 18 and 19 must be such that the bite thereof extends at least as far as the most rearward hook of the lure and preferably for some distance beyond in order to make good engagement with the obstruction. As a general rule, the shank portion of the grappling hooks 18 and 19 is approximately two to three times longer than the body of the lure. The juxtapositional relationship of the eyelet 14 and the tines of hooks 16 and 17 is a function of the distance between the nose of the lure and the swivel. Basically, the distance between the eyelet 14 and tines 16 and 17 must be less than the distance between the nose of the lure and the barrel portion of the swivel in order for the swivel to pass over the tines 16 and 17 to allow engagement therewith. The tines 16 and 17 with the eyelet 14 act to keep the fishing line in good alignment so that the swivel invariably aligns with tines 16 and 17. It is obvious that variations on the use of these tines could be employed. For example, the tines 16 and 17 could be substituted by a plate 30 (see FIG. 3) having a backward curvature and having at least one slot therebetween.

Although there has been shown and described a particular embodiment of this invention, it will be obvious to those skilled in the art that various changes and modifications may be made therein without departing from the invention. For example, it is possible to provide additional grappling hooks, or additional minor hooks, in order to increase the probability of ensnaring the obstruction or an appropriate portion of the lure.

I claim:

1. A device for retrieving a snagged fishing line having a lure and interconnected swivel fitting at the lower end thereof located a first predetermined distance from the nose of the lure comprising:

an elongated body of substantial weight having a forward end, a rearward end, an upper side and a lower side, two grappling hooks of heavy guage wire stock capable of plastic deformation, each having a shank portion in substantial parallel alignment with the axis of said body, but below said axis, each extending from the forward end of said body for a distance approximately twice the length of the body of said lure, with one grappling hook extending slightly farther than the other, wherein the two grappling hooks are formed of one continuous piece of heavy guage wire and extending through the full length of said body extending out the rearward end thereof to form a loop suitable for attaching a cord, a first eyelet, for detachably connecting to said fishing line, located on the upper side of said body toward the rearward end thereof, a second eyelet, for detachably connecting to said fishing line, located on the upper side of said body toward the forward end thereof, the opening in said eyelet being large enough to allow said swivel fitting to pass therethrough, two wire members protruding substantially vertical for a short distance from the upper side of said body at a point substantially back from the forward end of said body, said members after extending vertically a short distance being bent forward forming a shank portion extending forward and then bent upwardly and curved slightly backwardly forming a hook at the end thereof at a distance less than said first predetermined distance prior to reaching said second eyelet, the slot between said hooks being in substantial alignment with said eyelets, and being less than the width of said swivel fitting, whereby said swivel fitting may be engaged in the slot of said upwardly extending wire members, said two wire members being fabricated of a material that can be bent so that the wire members may be spread to avoid engagement of the swivel fitting and a keeper is slidably mounted on said wire members so that it may be moved rearwardly to permit spreading of said wire members or moved forwardly to firmly hold the wire members a fixed distance apart, thereby defining a slot narrower than the width of said swivel fitting.

2. A device as in claim 1 wherein the first and second eyelet are formed of one continuous wire, the two wire members positioned between said eyelets, which are of one continuous wire that, within said body, loops around the heavy guage wire forming the grappling hooks, and said heavy guage wire for the grappling hooks are firmly affixed to one another and the body is formed around said assembled wires by casting said body from molten lead.

3. A device as in claim 2 wherein the wires are firmly affixed to one another by soldering.

4. A device as in claim 2 wherein the wires are firmly affixed to one another by welding.

5. A device as in claim 1 wherein the lure is of the type containing at least two swivel mounted hooks and means for engaging at least one of said swivel mounted hooks are attached between the one grappling hook and the other in the shank portions thereof at a position that is sufficiently far forward to extend at least as far as the hook of the lure which is not snagged.

6. A device as in claim 5 wherein said means attached between the two grappling hooks is a solid member affixed to said grappling hooks.

7. A device as in claim 5 wherein said solid member is a heavy guage wire.

8. A device as in claim 5 wherein said means attached between the two grappling hooks is a chain affixed to said grappling hooks.

9. A device as in claim 8 wherein the ends of the chain distend for some distance beyond the point of attachment to the grappling hook shanks.

10. A device as in claim 5 wherein the means attached between the two grappling hooks is slidably attached thereto so that the distance of the means from the second eyelet may be varied.

* * * * *